United States Patent
Dahan et al.

(10) Patent No.: US 7,149,768 B2
(45) Date of Patent: Dec. 12, 2006

(54) 3-INPUT ARITHMETIC LOGIC UNIT

(75) Inventors: David Dahan, Pardes Hanna (IL); Rafi Fried, Caesarea (IL)

(73) Assignee: Ceva D.S.P. Ltd., Herzliya (IL)

( * ) Notice: Subject to any disclaimer, the term of this patent is extended or adjusted under 35 U.S.C. 154(b) by 687 days.

(21) Appl. No.: 10/271,901

(22) Filed: Oct. 15, 2002

(65) Prior Publication Data
US 2004/0073585 A1   Apr. 15, 2004

(51) Int. Cl.
*G06F 7/50* (2006.01)
(52) U.S. Cl. ........................ 708/709; 708/518
(58) Field of Classification Search .............. 708/709, 708/518
See application file for complete search history.

(56) References Cited

U.S. PATENT DOCUMENTS

| | | | | |
|---|---|---|---|---|
| 4,707,800 A | * | 11/1987 | Montrone et al. | 708/518 |
| 5,327,369 A | * | 7/1994 | Ashkenazi | 708/518 |
| 5,883,824 A | * | 3/1999 | Lee et al. | 708/518 |
| 6,003,125 A | * | 12/1999 | Shippy | 708/709 |
| 6,260,055 B1 | * | 7/2001 | Sugeno et al. | 708/518 |
| 6,292,818 B1 | * | 9/2001 | Winters | 708/709 |
| 6,449,629 B1 | * | 9/2002 | Morgan | 708/709 |
| 6,748,411 B1 | * | 6/2004 | Hakami | 708/709 |

* cited by examiner

*Primary Examiner*—Tan V. Mai
(74) *Attorney, Agent, or Firm*—Nath & Associates PLLC; Gregory B. Kang; Jerald L. Meyer

(57) ABSTRACT

A 3-input adder/subtractor unit, having a first input for receiving a first operand A, a second input for receiving a second operand B, and a third input for receiving a third operand C. An add/subtract unit includes a control input for receiving a user-specified opcode, a first 3-to-2 compressor for receiving a respective least significant bit of said operands or its complement, and a Half Adder coupled to the first 3-to-2 compressor and responsive to an output thereof and to said opcode for outputting a least significant bit of a sum equal to A+B+C or A+B−C or A−B+C or A−B−C. A plurality of 3-to-2 compressors each in respect of remaining bits of the operands receive a respective bit of the operands or its complement, and a 2-input adder coupled to the 3-to-2 compressors receive respective carry and save outputs thereof and computing respective bits of the sum apart from the least significant bit.

5 Claims, 3 Drawing Sheets

3-INPUT ARITHMETIC LOGIC UNIT

FIELD OF THE INVENTION

This invention relates to arithmetic units particularly used for Digital Signal Processing.

BACKGROUND OF THE INVENTION

In many advanced applications, Digital Signal Processing (DSP) is required, usually when analog and digital systems meet. Increasing the number of operands being used in each calculation increases the data computation rate. Thus, the standard 2-input Adder can add two operands while the 3-input Adder can add three operands, increasing the data computation rate by a factor of 50%.

One of the main tasks of DSP is the summation of multiplication operations:

$$\Sigma Ai*Xi$$

In order to execute such tasks a Multiply and Accumulate (MAC) Unit is used, which also requires a multiplier and adder. The trend in DSP implementation is to increase the number of MAC Units in order to increase the data computation rate. The 3-input AU can be used in such cases and has several advantages.

In the case where the products of two multipliers should be summed, the 3-input arithmetic unit illustrated in FIG. 1$b$ can accumulate the result more easily than two separate 2-input Adders illustrated in FIG. 1$a$, thus requiring only one accumulator instead of two.

In other applications such as complex multiplication, the 3-input AU can increase data computation rates. Complex multiplication is very important and is used in many applications such as FFT (Fast Fourier Transform), which is very commonly used in many DSP applications. The multiplication of two complex numbers A and B is computed as follows:

$$\Sigma(Ar+i*Ai)*(Br+i*Bi)=\Sigma[(Ar*Br-Ai*Bi)+i*(Ar*Bi+Ai*Br)]$$

In order to implement such a task, the real and imaginary parts have to be calculated separately. In each calculation, two multipliers are needed as well as a single 3-input AU in order to accumulate the multipliers result, as shown in FIG. 1$a$.

As is known, when an adder is used to subtract a second operand from a first operand, this is done by adding to the first operand the twos complement of the second operand. This, in turn, is achieved by inverting each bit in the second operand and adding "1", thus, in effect, requiring an additional adder, and increasing the computation time because each adder imposes its own computing overhead. The problem is further compounded when second and third operands are successively subtracted from a first operand, i.e. A–B–C. In this case, the two complements of both B and C must be derived by inverting each operand and adding two "1"s, thus requiring in total five adders, and even further increasing the computation overhead.

It would therefore be of particular benefit to provide a 3-input adder for inputting three operands A, B and C and being capable of computing A–B–C without requiring additional adder stages, since this would decrease the computing overhead and increase computation speed.

It would be of further benefit to configure such a 3-input adder to implement split operand arithmetic so as more efficiently to carry out complex arithmetic, as explained above.

SUMMARY OF THE INVENTION

It is therefore a principal object of the present invention to provide a 3-input adder for inputting three operands A, B and C and being capable of computing A–B–C without requiring additional adder stages.

It is a further object of the invention configure such a 3-input adder to implement split operand arithmetic so as more efficiently to carry out complex arithmetic.

These objectives are realized in accordance with the invention by a 3-input adder/subtractor unit, comprising:
  a first input for receiving a first operand A,
  a second input for receiving a second operand B,
  a third input for receiving a third operand C,
  an add/subtract unit including:
    a control input for receiving a user-specified opcode,
    a first 3-to-2 carry-save adder for receiving a repective least significant bit of said operands or its complement,
    a Half Adder coupled to the first 3-to-2 carry-save adder and responsive to an output thereof and to a first bit of said opcode for outputting a least significant bit of a sum equal to A+B+C or A+B–C or A–B+C or A–B–C,
    a plurality of 3-to-2 carry-save adders each in respect of remaining bits of said operand for receiving a repective bit of said operands or its complement,
    a 2-input adder coupled to all of said 3-to-2 carry-save adders for receiving respective carry and save outputs thereof and computing respective bits of said sum apart from the least significant bit, and
    a logic circuit having inputs coupled to a carry out bit of the Half Adder and to a second bit of the opcode and being responsive to either or both of said input being at logic "1" for feeding a logic "1" bit to a carry input of the 2-input adder.

According to a further aspect of the invention there is provided a hardware-implemented method for computing a sum of three operands A, B and C, said method comprising:
  (a) providing a user-specified opcode for indicating that the sum must be equal to A+B+C or A+B–C or A–B+C or A–B–C,
  (b) computing a least significant bit of the sum and propagating a carry bit thereof through a chain of 3-to-2 compressors each in respect of remaining bits of said operands for receiving a respective bit of said operands or its complement, and producing respective carry and save output pairs, and
  (c) summing the respective carry and save output pairs for computing respective bits of said sum apart from the least significant bit.

The invention provides an improved AU architecture that supports four arithmetic operations between three user-defined operands. The four arithmetic operations are add, add-sub, sub-add and sub-sub.

Furthermore, the same architecture implements split instructions between two operands using the same hardware without overhead.

The 3-Input AU according to the invention allows DSPs to execute parallel instructions in one given machine cycle in Normal Mode or Split Mode.

The main features of the 3-input AU according to the invention can be summarized as follows:
  Split Mode, add/sub low and high part of two operands independently.
  Twos-Complement Arithmetic.
  Can be implemented in N bits word width.

Technology Independent

The 3-input AU according to the invention has a simple control signal (OpCode) issued by the user. This signal is used to select the operand in an Add instruction and the inverted operand in a sub-instruction, the selected value being issued to the Add/Sub Unit.

The Add/Subtract Unit employs 3-to-2 Carry Save Adders (CSA) to compress the three input to two vectors (a Sum Vector and a Carry Vector). A conditional sum with a Carry Look Ahead mechanism is used to sum the two vectors.

In split mode, carry out from the low part is ignored by the high part, and the carry vector (shown as 16C in FIG. 3) is forced to zero.

The implementation described at the Logic Level can be fabricated in CMOS, Bipolar or other technologies.

The AU (Arithmetic Unit) performs the following operation according to the Op Code issued by the user.

TABLE I

| note | Operation | Cin high | Cin low | Split | (i)Op Code |
|---|---|---|---|---|---|
| Add-Add | (a)A + B + C | 0 | 0 | 0 | 0 0 0 0 |
| Add-Sub | A + B − C | 0 | 1 | 0 | 0 0 1 1 |
| Sub-Add | A − B + C | 0 | 1 | 0 | 1 1 0 0 |
| Sub-Sub | A − B − C | 0 | 1 | 0 | 1 1 1 1 |
| C = '0' | Ah + Bh; Al + Bl | 0 | 0 | 1 | 1 1 X X |
| C = '0' | Ah + Bh; Al − Bl | 0 | 0 | 1 | 0 1 X X |
| C = '0' | Ah − Bh; Al + Bl | 1 | 0 | 1 | 1 0 X X |
| C = '0' | Ah − Bh; Al − Bl | 1 | 1 | 1 | 1 1 X X |
| B = '0' | Ah + Ch; Al + Cl | 0 | 0 | 1 | X X 0 0 |
| B = '0' | Ah + Ch; Al − Cl | 0 | 1 | 1 | X X 1 0 |
| B = '0' | Ah − Ch; Al + Cl | 1 | 0 | 1 | X X 0 1 |
| B = '0' | Ah − Bh; Bl − Cl | 1 | 1 | 1 | X X 1 1 |

X stand for don't care

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Figure 1A:
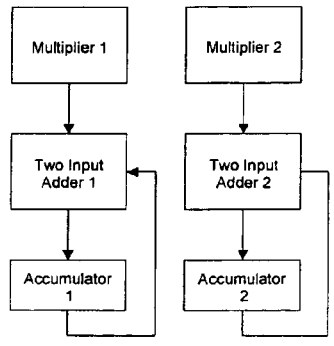
FIGS. 1a and 1b are block diagrams showing functionally Summing Multipliers using Dual MAC Units with 2- and 3-input arithmetic units, respectively.
Figure 1B:
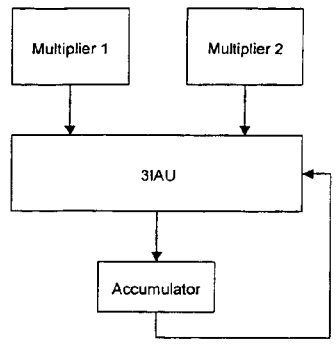
Figure 2:
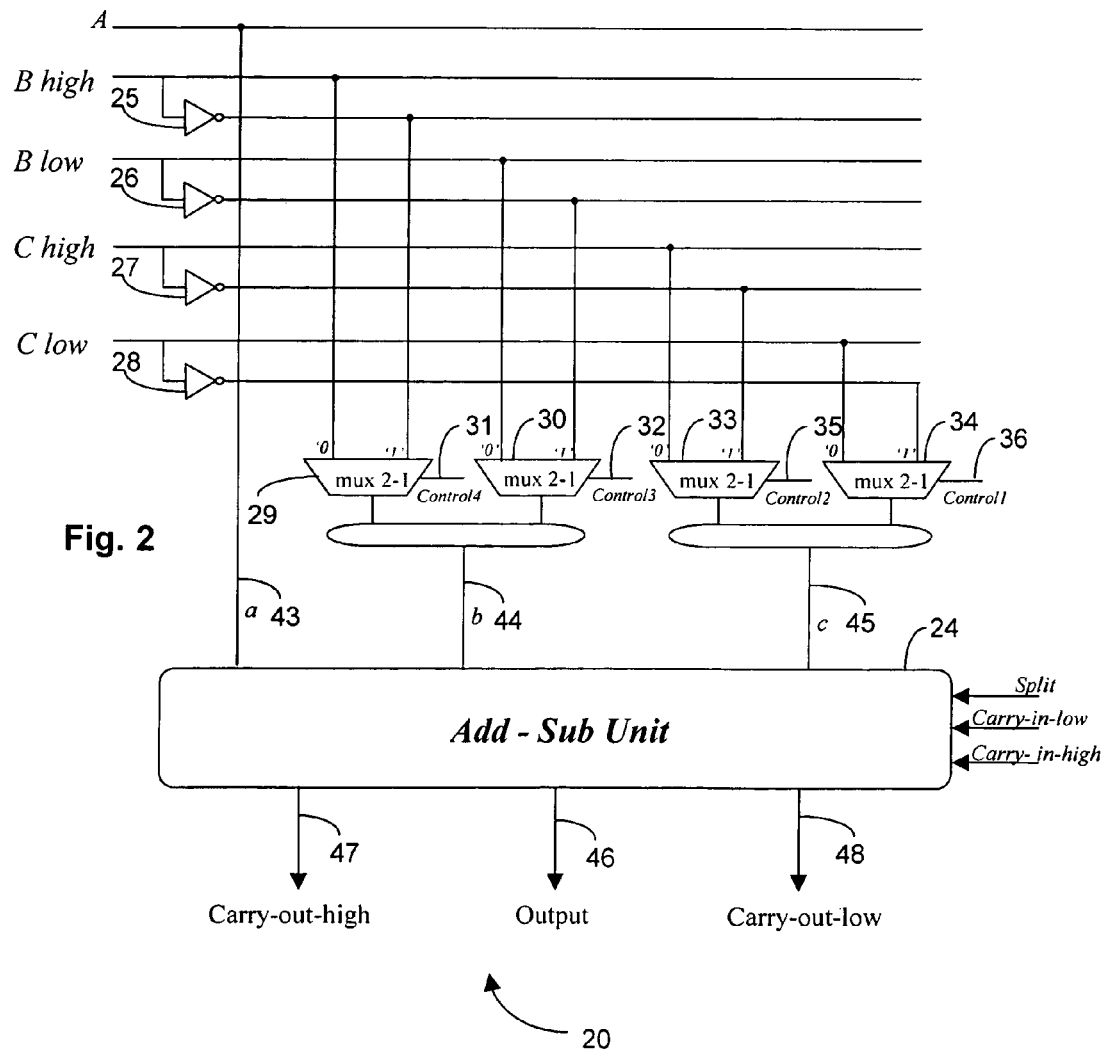
FIG. 2 is a block diagram showing schematically the 3-input arithmetic unit of FIG. 1b.

FIG. 2 shows schematically a 3-Input AU depicted generally as 20 having first, second and third inputs 21, 22 and 23 for feeding thereto respective first, second and third operands, A, B and C. The first operand A is fed directly to an Add/Sub Unit 24 since none of the operations uses the twos complement of A. The second and third operands B and C, respectively, are both split into high components B (high) and C (high) and into low components B (low) and C (low).

Most typically, the operands are words having a defined number of bits, e.g. 32. In such case, the high component is the 16 most significant bits and the low component is the 16 least significant bits. The high and low components of the second operand B are inverted by respective inverters 25 and 26 so as to produce their respective complements $\overline{B}$ (high) and $\overline{B}$ (low) whilst the high and low components of the third operand C are inverted by respective inverters 27 and 28 so as to produce their respective complements $\overline{C}$ (high) and $\overline{C}$ (low). For the sake of simplicity, FIG. 2 shows the operations performed on the operands per se. In fact, the operations are performed on each bit of the first operand A and on each bit of the high and low components of the second and third operands B and C and on their respective complements $\overline{B}$ and $\overline{C}$. The full bit-by-bit implementation for a 32-bit adder is explained in greater detail below with reference to FIG. 3 of the drawings.

The high and low components of the second operand B as well as their respective complements are fed to respective 2-to-1 multiplexers 29 and 30 each having a respective control input 31 and 32, which controls whether the output of the respective multiplexer 29 and 30 is the high and low component of B or the high and low component of $\overline{B}$. Likewise, high and low components of the third operand C as well as their respective complements are fed to respective 2-to-1 multiplexers 33 and 34 each having a respective control input 35 and 36, which controls whether the output of the respective multiplexer 33 and 34 is the high and low component of C or the high and low part of $\overline{C}$.

In order to achieve high speed, the controls to the respective multiplexers 29, 30, 33 and 34 are issued directly using an Op Code without a Decode stage. Table II below lists conversions from the Op Code to the controls:

Table II

| Value | Control |
|---|---|
| Opcode[0] | Control1 (36) |
| Opcode[1] | Control2 (35) |
| Opcode[2] | Control3 (32) |
| Opcode[3] | Control4 (31) |

Two carries are input to the Add/Sub Unit 24, designated Carry-in-low 40 and a Carry-in-high 41. In full width operation the Carry-in-low is used as carry in and the Carry-in-high is ignored. A Split Mode control 42 may also be fed to the Add/Sub Unit 24 whereby the Carry-in-low is used as carry in for the low component and Carry-in-high is used as carry in for the high component. This is explained in greater detail below with reference to FIG. 3 of the drawings.

With this architecture, the Add/Sub Unit 24 can support a Split Mode option and implement the high speed 3-Input Adder.

The inputs issued to the Add/Sub unit 24 are:
(i) Three inputs a, b and c designated respectively 43, 44 and 45 for feeding thereto the operands A, B and C, or A, $\overline{B}$ and C or A, B and $\overline{C}$ according to the specified opcode as described in Table I.
(ii) Carry-in-low 40 used as carry in during full width operation and carry in to the low part in Split Mode operation.
(iii) Carry-in-high 41 used as carry in to the high part in Split Mode operation.
(iv) Split Mode Control 42 set to HIGH in Split Mode and to LOW in Full width Mode.

The outputs from the Add/Sub Unit 24 are:

(i) 32 bit data output designated 46.

(ii) Carry-out-high designated 47 (the carry out in summation of 3 input binary words is 2 bit).

Figure 3:
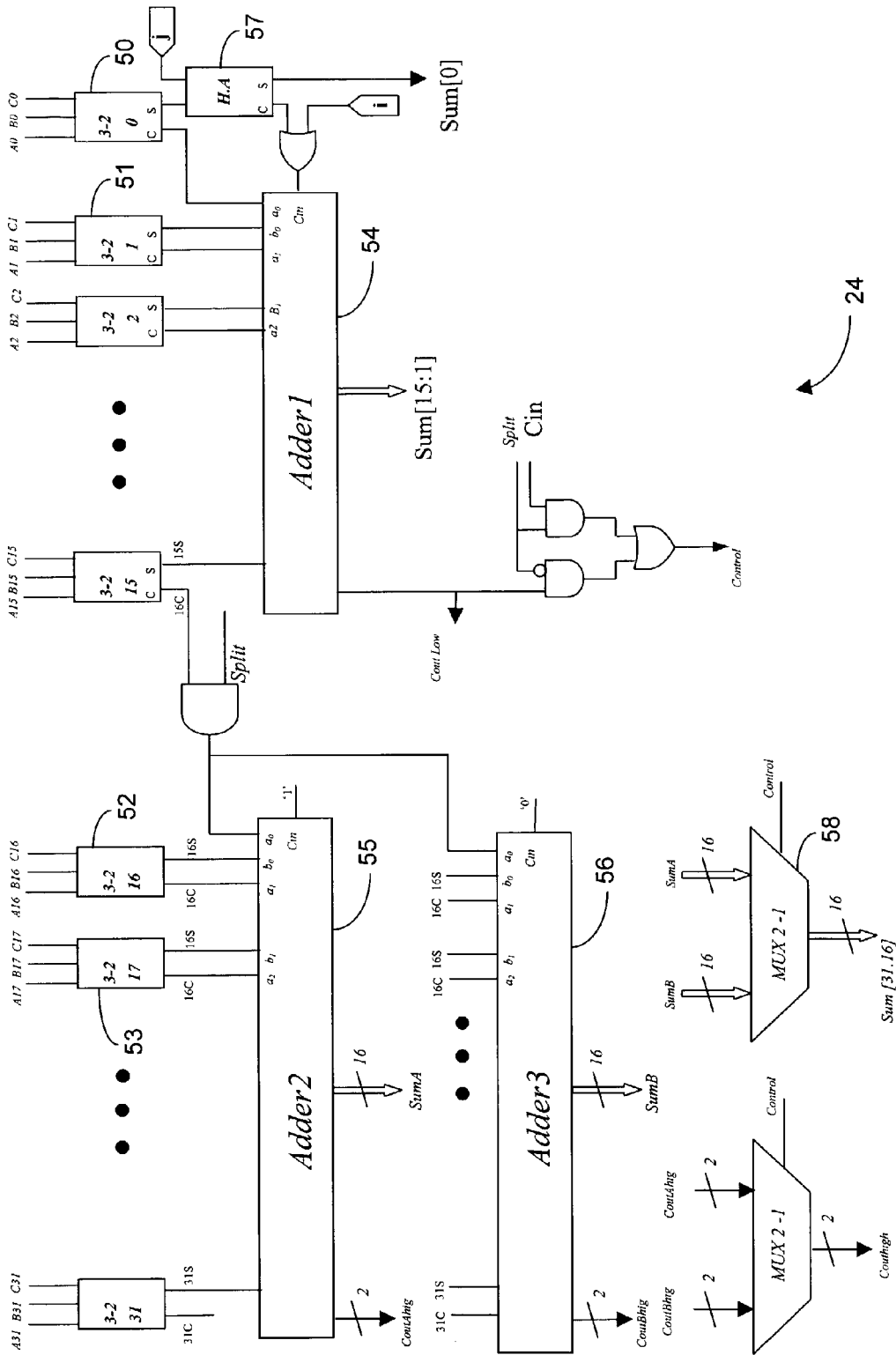
FIG. 3 is a schematic representation showing an implementation of a 32 bit 3-input Add/Subtract Unit for use in the 3-input arithmetic unit shown in FIG. 2.

(iii) Carry-out-low designated 48, carry out of the low part in Split Mode—the data is valid only in Split Mode Add/Sub Unit FIG. 3 shows an actual implementation of the Add/Sub Unit 24 having 32 bits. In the following description, numerous specific details, such as the number of bits, are provided by way of non-limiting example only to enable a thorough understanding of the invention. The Add/Sub Unit 24 can be implemented with a ripple Carry Adder, Carry Look Ahead or any other 2-Input Adder, although preferably a Carry Look Ahead adder is used so as to achieve best timing performance.

Also, as seen in FIG. 3, a conditional sum is used to achieve the best timing performance the invention. The Add/Sub Unit 24 employs 3-to-2 Carry Save Adders (CSA) to compress the three bits derived from each bit of the three input operands A, B and C to only two operands. In the figure, the Least Significant Bit of the low component of each of the operands is fed to a CSA 50, the next Least Significant Bit of the low component of each of the operands is fed to a CSA 51, and so on. Likewise, the Least Significant Bit of the high component of each of the operands is fed to a CSA 52, the next Least Significant Bit of the high component of each of the operands is fed to a CSA 53, and so on. Each Carry Save Adder generates a Carry Vector and Sum Vector. The low components of these two vectors are added by a first 2-input adder 54 and the high components of the two vectors are added by a conditional sum and a second 2-input adder 55 and a third 2-input adder 56. The second and third 2-input adders 55 and 56 have identical functionality, their only difference being that their carry-in bits are set respectively to '1' and '0' according to the selected Op Code. Thus, denoting the first bit of each of three operands as $A_0$, $B_0$ and $C_0$, respectively, the first 3-to-2 Carry Save Adder 50 receives these bits $A_0$, $B_0$ and $C_0$ and produces at respective outputs a Carry bit and a Sum bit. The Carry and Sum bits from each of the Carry Save Adders apart from the first are added by the first 2-input adder 54 or the second and third 2-input adders 55 and 56.

The first stage in the Add/Sub Unit 24 compresses the three inputs to two vectors: a Carry Vector and a Sum Vector. Standard Full Adder Cells are employed as shown in FIG. 3, their implementation being as shown in FIG. 4*b*. Each cell constituted by a respective Full Adder receives a three input signal and provides an Output Sum Signal and a Carry Out Signal. The sum signal is presented by equation (1):

$$S = a \oplus b \oplus c \qquad (1)$$

where a and b are the data inputs, c is the carry in, and the sign stands for Exclusive OR.

The carry out of the Full Adder is presented by equation (2):

$$Co = a \cdot b + c \cdot (a+b) \qquad (2)$$

where the sign · stands for logic AND and the sign + stands for logic OR.

The second stage is to sum the Carry Vector and the Sum Vector. The carry vector is shifted one bit left prior to inputting to the first 2-input adder 54. Thus, it is seen from FIG. 3 that the least significant carry output derived from the sum of A0, B0 and C0 is fed to the $a_0$ input of the first 2-input adder 54, where it is added to the sum of A1, B1 and C1 fed to the $b_0$ input thereof. This is expressed mathematically in equation (3):

$$Out[n] = S[n+1] + C[n] \qquad (3)$$

The Add/Sub Unit 24 supports four combinations as described in Table I. Using twos-complement arithmetic the sum of the four combinations can be described by the equations (4), (5), (6) and (7).

$$\text{Sum} = A+B+C \qquad (4)$$

$$\text{Sum} = A-B+C = A+\overline{B}+1+C \qquad (5)$$

$$\text{Sum} = A+B-C = A+B+\overline{C}+1 \qquad (6)$$

$$\text{Sum} = A-B-C = A+\overline{B}+1+\overline{C}+1 \qquad (7)$$

All four forms of the combinations described by equations (4) to (7) can be summarized by equation (8):

$$\text{Sum} = A + b + \alpha + c + \beta \qquad (8)$$

Where:

$b = B$ or $\overline{B}$, $c = C$ or $\overline{C}$ and $\alpha$ and $\beta$ can be 1 or 0 (zero extended to n bit).

To implement the addition contemplated by equation (8) with Carry Save Adders conventionally requires the use of 5-to-2 CSA compressors having the following inputs:

a(n) . . . a(1) a(0)
b(n) . . . b(1) b(0)
0 . . . 0 $\alpha$
c(n) . . . c(1) c(0)
0 . . . 0 $\beta$ Since $\alpha$ and $\beta$ are constant (1 or 0), $\alpha+\beta$ will also be constant and can be set to all the combinations as shown below in Table III:

TABLE III

| | $\alpha$ | $\beta$ | $\alpha + \beta$ |
|---|---|---|---|
| A + B + C | 0 | 0 | 00 |
| A − B + C | 0 | 1 | 01 |
| A + B − C | 1 | 0 | 01 |
| A − B − C | 1 | 1 | 10 |

Letting i be the MSB and j the LSB in ($\alpha+\beta$), the summation with i and j is illustrated as follows with further reference to FIG. 3 of the drawings.

i and j are fed to the Add/Sub Unit 24 from the Op Code fed to the arithmetic unit 20 as listed in Table II and shown in FIG. 2. Thus, it is seen that according to the invention, when using i and j, 4-to-2 compressors are needed, since the carry is propagated and the critical path is not in the LSB. This is an improvement over the conventional approach where as noted above the addition contemplated by equation (8) is implemented with Carry Save Adders requiring the use of 5-to-2 CSA compressors. The least significant row is summed by the Full Adder 50 and a Half Adder 57, Sum[0] being the output of the Half Adder 57 without any further manipulation being required. Since the carry vector is shifted one bit left, the carry out of the Full Adder 50 is fed to the 2-input adder 51 via its $a_0$ input.

The second row (LSB+1) A[1], B[1] and C[1] are compressed by the 3-to-2 compressor 51 and fed to the 2-input adder 54. The carry in to the 2-input adder 54 can be either i or the carry out of the Half Adder 57.

The principle of a conditional sum implemented in the high byte second 2-input adder 55 calculates the high byte of the sum under the assumption that the carry in (to the 2-input adder 55) is '1' and produces at its output a provisional sum sumA. Likewise, the third 2-input adder 55 calculates the high byte of the sum under the assumption that the carry in (to the 2-input adder 56) is '0' and produces at its output a provisional sum, sumB. A 2-to-1 Multiplexer 58 selects between the provisional sums sumA and sumB calculated by the 2-input adders 55 and 56 according to the control as well as the carry out high. Specifically, if the control is high sumA-carryA is selected as output; if the control is low sumB, carryB is selected.

The control to the Multiplexer 58 generates three signals:
1. Carry out low (carry out of CLA block).
2. Carry in high (issued by the user).
3. Split Mode indication (issued by the user).

In Full width Mode the control is equal to the carry out low issued from the low part, in Split Mode the control is equal to the carry in high input to the unit.

Basic Cells

Figure 4A:
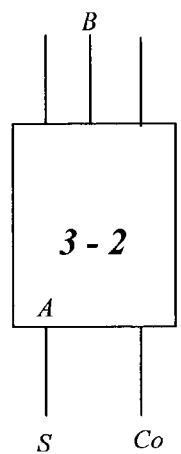
FIGS. 4a and 4b are schematic representations showing implementations of a Full Adder used as a 3–2 Compressor in the Add/Subtract Unit of FIG. 2.
Figure 4B:
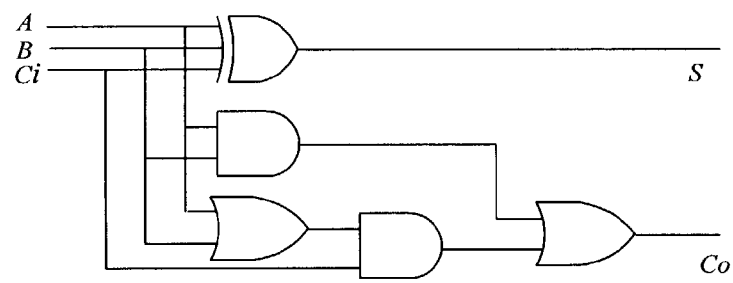

Full Adder (3-to-2 Compressor):

FIG. 4a shows symbolically the Full Adder used as a 3-to-2 compressor in the Carry Save Adder, whose Truth Table is a shown below: FIG. 4b shows how the Full Adder is implemented using standard logic elements.

| Truth Table | | | | |
|---|---|---|---|---|
| S | Co | Ci | B | A |
| 0 | 0 | 0 | 0 | 0 |
| 1 | 0 | 1 | 0 | 0 |
| 1 | 0 | 0 | 1 | 0 |
| 0 | 1 | 1 | 1 | 0 |
| 1 | 0 | 0 | 0 | 1 |
| 0 | 1 | 1 | 0 | 1 |
| 0 | 1 | 0 | 1 | 1 |
| 1 | 1 | 1 | 1 | 1 |

Half Adder

Figure 5A:
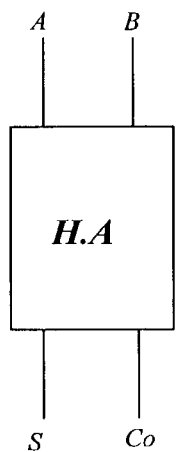
FIGS. 5a and 5b are schematic representations showing implementations of a Half Adder used in the Add/Subtract Unit of FIG. 2.
Figure 5B:
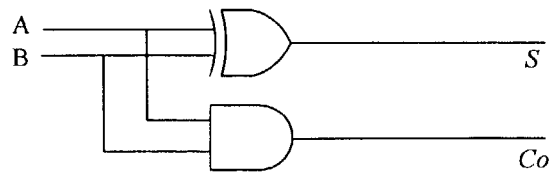

FIG. 5a shows symbolically the Half Adder, whose Truth Table is a shown below: FIG. 5b shows how the Half Adder is implemented using standard logic elements.

| Truth Table | | | |
|---|---|---|---|
| S | Co | B | A |
| 0 | 0 | 0 | 0 |
| 1 | 0 | 0 | 1 |
| 1 | 0 | 1 | 0 |
| 0 | 1 | 1 | 1 |

EXAMPLES

In order to understand the invention, some examples will now be described showing how the 3-Input AU 20 performs various arithmetic operations on three operands A=111, B=101 and C=011:

1. A+B+C
   i=0,j=0 (as shown in Table III)
   A0=1
   B0=1
   C0=1
   S[0]=1 (from Least Significant 3-to-2 Adder) passed to the H.A and since j=0, sum[0]=1 and $C_{out}$=0 (Carry out from Half Adder 57 is 0 since j=0). Cin=0 since both $C_{out}$ and i are 0. This gives:
   a0=1
   Cin=0
   A1=1
   B1=0
   C1=1
   b0=0
   a1=1
   A2=1
   B2=1
   C2=0
   b1=0
   a2=1

As explained above, the Adder 54 sums each of the two same-order bits so as to produce corresponding bits of the sum, displaced by one bit to the left. The zero order output is not generated by the Adder 54, but rather is equal to the Sum[0] output of the half adder 57. The sum is therefore represented as follows:

Sum[0]=S output of the half adder 57

Sum[1]=$a_0+b_0$

Sum[2]=$a_1+b_1$ where Sum[3]=$a_2+b_2$ $a_0$=1
b0=0
a1=1
b1=0
$a_2$=1
$b_2$=0 (not defined)

This gives:

Sum[0]=1

Sum[1]=$a_0+b_0$=1

Sum[2]=$a_1+b_1$=1

Sum[3]=$a_2+b_2$=1

So the value of A+B+C is 1111, which is correct.

2. A−B+C
   i=0,j=1 (as shown in Table III)
   A0=1
   $\overline{B0}$=0
   C=1
   S[0]=0 (from Least Significant 3-to-2 Adder) passed to the H.A and since j=1, sum[0]=S[0]+j=1 and $C_{out}$=0 (Carry out from Half Adder 57 is 0 since one input, S[0], is 0). Cin=0 since both $C_{out}$ and i are 0. This gives:
   a0=1
   Cin=0
   A1=1
   B1=0
   C1=1
   b0=0
   a1=1
   A2=1
   $\overline{B2}$=0
   C2=0
   b1=1
   a2=0

As explained above, the Adder 54 sums each of the two same-order bits so as to produce corresponding bits of the sum, displaced by one bit to the left. The zero order output is not generated by the Adder 54, but rather is equal to the Sum[0] output of the half adder 57. The sum is therefore represented as follows:

Sum[0]=S output of the half adder 57

Sum[1]=$a_0+b_0$

Sum[2]=$a_1+b_1$

Sum[3]=$a_2+b_2$ where:
$a_0=1$
$b_0=0$
$a_1=1$
$b_1=1$
$a2=0$
$b_2=0$ (not defined)

This gives:

Sum[0]=1

Sum[1]=$a_0+b_0$=1

Sum[2]=$a_1+b_1$=0

Sum[3]=$a_2+b_2$=0

So the value of A−B+C is 0011, which is correct.

The invention claimed is:

1. A 3-input adder/subtractor unit, comprising:
a first input for receiving a first operand A,
a second input for receiving a second operand B,
a third input for receiving a third operand C, and
an add/subtract unit including:
a control input for receiving a user-specified opcode,
a first 3-to-2 carry-save adder for receiving a respective least significant bit of said operands or its complement,
a Half Adder coupled to the first 3-to-2 carry-save adder and responsive to an output thereof and to a first bit of said opcode for outputting a least significant bit of a sum equal to A+B+C or A+B−C or A−B+C or A−B−C,
a plurality of 3-to-2 carry-save adders each in respect of remaining bits of said operands for receiving a respective bit of said operands or its complement,
a 2-input adder coupled to all of said 3-to-2 carry-save adders for receiving respective carry and save outputs thereof and computing respective bits of said sum apart from the least significant bit, and
a logic circuit having inputs coupled to a carry out bit of the Half Adder and to a second bit of the opcode and being responsive to either or both of said input being at logic "1" for feeding a logic "1" bit to a carry input of the 2-input adder.

2. The 3-input adder/subtractor unit according to claim 1, wherein at least one of the first, second and third operands is a single bit.

3. The 3-input adder/subtractor unit according to claim 1, wherein at least one of the first, second and third operands is a word comprising multiple bits.

4. The 3-input adder/subtractor unit according to claim 3, wherein the 2-input adder comprises:
a first 2-input adder having a plurality of inputs each coupled to a respective one of the 2-input carry save adders for summing a low component of said output,
a second 2-input adder having a carry-in bit set to '1' and having a plurality of inputs each coupled to a respective one of the 2-input carry save adders for summing a first high component of said output,
a third 2-input adder having a carry-in bit set to '0' and having a plurality of inputs each coupled to a respective one of the 2-input carry save adders for summing a second high component of said output, and
a multiplexer coupled to respective outputs of the second and third 2-input adders and being responsive to the opcode for selecting the first or second high components.

5. The 3-input adder/subtractor unit according to claim 1, wherein the add/subtract unit is responsive to said opcode being set to a split mode opcode for outputting a low byte component of the sum at an output of the first 2-input carry save adder and for outputting a high byte component of the sum at an output of the second and third 2-input carry save adders.

* * * * *